US012676250B2

(12) United States Patent
Rasmussen

(10) Patent No.: US 12,676,250 B2
(45) Date of Patent: Jul. 7, 2026

(54) CABLE SUBSTITUTE FOR MINERAL-INSULATED CABLES IN NUCLEAR FACILITIES

(71) Applicant: RSCC Wire and Cable LLC, East Granby, CT (US)

(72) Inventor: Eric Jason Rasmussen, West Hartford, CT (US)

(73) Assignee: RSCC Wire and Cable LLC, East Granby, CT (US)

( * ) Notice: Subject to any disclaimer, the term of this patent is extended or adjusted under 35 U.S.C. 154(b) by 0 days.

(21) Appl. No.: 18/354,495

(22) Filed: Jul. 18, 2023

(65) Prior Publication Data

US 2024/0021342 A1 Jan. 18, 2024

Related U.S. Application Data

(60) Provisional application No. 63/390,129, filed on Jul. 18, 2022.

(51) Int. Cl.

*H01B 7/20* (2006.01)
*H01B 7/00* (2006.01)
*H01B 7/02* (2006.01)
*H01B 7/282* (2006.01)
*H01B 3/04* (2006.01)

(52) U.S. Cl.

CPC ............. *H01B 7/20* (2013.01); *H01B 7/0009* (2013.01); *H01B 7/025* (2013.01); *H01B 7/0258* (2013.01); *H01B 7/0266* (2013.01); *H01B 7/2825* (2013.01); *H01B 3/04* (2013.01)

(58) Field of Classification Search

CPC ................................ H01B 7/0208; H01B 7/20
USPC .......................................... 174/102 D, 120 R
See application file for complete search history.

(56) References Cited

U.S. PATENT DOCUMENTS 4,626,810 A * 12/1986 Nixon ........................ H01P 3/06 156/244.11
5,414,217 A * 5/1995 Neuroth ............... H01B 7/2806 174/120 AR
5,969,229 A * 10/1999 Hori ..................... H01B 7/0009 73/23.31

(Continued)

FOREIGN PATENT DOCUMENTS

JP 2006-147507 * 6/2006

*Primary Examiner* — Chau N Nguyen
(74) *Attorney, Agent, or Firm* — Arnold & Porter Kaye Scholer LLP

(57) ABSTRACT

An electrical cable for use as a substitute for mineral-insulated cables in nuclear facilities is described herein. The cable may include at least one conductor, insulation, a jacket, and an armor shell. In some embodiments, the conductor may comprise a stranded conductor of one of various grades. The insulation may comprise phlogopite or muscovite mica tape that may be helically or longitudinally applied in overlapping concentric layers around at least one conductor. The jacket may comprise a woven glass braid applied over insulation surrounding one or multiple conductors. The armor may comprise hermitically sealed metallic armor applied around the other components of the cable, thereby forming an exterior of the cable. The inorganic materials utilized may be configured to limit the creation of adverse and/or undesirable elements instigated by transmutation from neutron irradiation exposure.

20 Claims, 8 Drawing Sheets

(56) References Cited

U.S. PATENT DOCUMENTS

| | | | | |
|---|---|---|---|---|
| 6,486,395 | B1 * | 11/2002 | Temblador | H01B 9/02<br>174/102 R |
| 8,124,875 | B2 * | 2/2012 | Aitken | H01B 9/028<br>174/109 |
| 9,892,824 | B2 * | 2/2018 | Perego | H01B 7/14 |
| 10,804,002 | B2 * | 10/2020 | Lee | H01B 1/02 |
| 11,276,511 | B2 * | 3/2022 | Blair | H01B 3/46 |
| 2009/0250238 | A1 * | 10/2009 | Picard | H01B 9/028<br>174/103 |
| 2011/0011617 | A1 * | 1/2011 | Walid | H01B 7/288<br>174/116 |
| 2014/0102749 | A1 * | 4/2014 | Varkey | H01B 19/00<br>174/102 R |
| 2020/0295332 | A1 * | 9/2020 | Jeong | B32B 5/028 |

* cited by examiner

CABLE SUBSTITUTE FOR MINERAL-INSULATED CABLES IN NUCLEAR FACILITIES

RELATED APPLICATIONS

This application claims priority to U.S. Provisional Patent Application No. 63/390,129 filed Jul. 18, 2022, the content of which is incorporated herein by reference in its entirety.

FIELD OF THE INVENTION

The present invention relates to an electrical cable specifically designed for use in nuclear facilities and, more particularly, to a substitute for costly mineral-insulated conventionally used in nuclear facilities.

BACKGROUND OF THE INVENTION

Nuclear facilities require various forms of cables to control and maintain operations within the facility. Nuclear facilities may include nuclear power generating stations, nuclear irradiation facilities, nuclear isotope processing facilities, nuclear waste disposal facilities, among other types of facilities. Environmental conditions at these nuclear facilities can induce chemical, transmutational, and/or structural changes to materials included within the facility. In particular, cables that include polymeric materials may be adversely affected. Unlike metals and ceramic materials, polymeric materials can degrade in high temperatures and are particularly susceptible to radiation. For example, polymeric materials at nuclear facilities can undergo thermal oxidation in the presence of oxygen as a result of chain scission or cross-linking among chains and the accumulation of oxidative products. For some polymeric materials, the migration of additives and plasticizers can also be significant. The rate of degradation is often accelerated by increases in temperature. In the case of radiation, gamma and neutron radiation are the most significant stressors for cables exposed to radiation during normal operation of the nuclear facilities, especially in the presence of oxygen.

In light of the foregoing, mineral-insulated cables are typically used nuclear facilities. A mineral-insulated cable is a variety of electrical cable made from copper conductors inside a copper sheath, insulated by inorganic magnesium oxide powder. The name is often abbreviated to mineral insulated copper clad (MICC) or mineral insulated metal sheathed (MIMS) cable. A mineral-insulated cable's usage of inorganic (i.e., non-polymeric) material enables it to adequately perform and function in the above-mentioned harsh environments. Indeed, nuclear facilities utilize mineral-insulated cables for applications that include exposure to neutron, gamma, beta, and/or alpha irradiation in excess of 200 Megarads and typically in excess of 1,000 Megarads total integrated dosage (TID) and/or temperatures up to 450° C. and/or continuous submergence in water or chemical solution. Mineral-insulated cables are also suitable for both safety-related and non-safety-related applications. However, mineral-insulated cables are typically expensive and may be difficult to obtain due to limits on materials (e.g., the minerals) and supply chain issues.

Accordingly, there is a need for a substitute for mineral-insulated cables for use in nuclear facilities. Specifically, there is a need for a substitute for mineral-insulated cables that is suitable for use in applications that include exposure to neutron, gamma, beta, and/or alpha irradiation in excess of 200 Megarads and, particularly, in excess of 1,000

Megarads total integrated dosage (TID). There is also a need for a substitute for mineral-insulated cables that is suitable for applications requiring use in temperatures up to 450° C. and/or continuous submergence in water or chemical solution.

SUMMARY OF THE INVENTION

Aspects of this disclosure relate to various embodiments of a cable for use in nuclear facilities as a substitute for mineral-insulated cables. In various embodiments, the cable described herein may be configured (and suitable) for use in applications that include exposure to neutron, gamma, beta, and/or alpha irradiation in excess of 200 Megarads and in excess of 1,000 Megarads total integrated dosage (TID). In various embodiments, the cable may include at least one conductor, insulation, a jacket, and an armor shell. The conductor may comprise one of copper, copper coated with nickel, or nickel. For example, in various embodiments, the conductor may comprise 27% nickel coated copper. In some embodiments, the conductor may comprise a stranded conductor of one of various grades. The insulation may comprise phlogopite or muscovite mica tape that may be helically or longitudinally applied in overlapping concentric layers around at least one conductor. The jacket may comprise a woven glass braid applied over insulation surrounding one or multiple conductors. The armor may comprise hermitically sealed metallic armor applied around the other components of the cable, thereby forming an exterior of the cable. In various embodiments, the armor shell may comprise corrugated or smooth copper that runs a length of the cable.

In various embodiments, the inorganic materials utilized may be configured to limit the creation of adverse and/or undesirable elements instigated by transmutation from neutron irradiation exposure. For example, the mica tape may include an elastomeric layer that bonds adjacent and overlapping mica tape layers that thru an oxidative pyrolysis process converts to an inorganic material yielding a completely inorganic insulation.

These and other objects, features, and characteristics of the invention disclosed herein will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present invention is illustrated by way of example and not limited in the accompanying figure in which like reference numerals indicate similar elements and in which.

Figure 1:
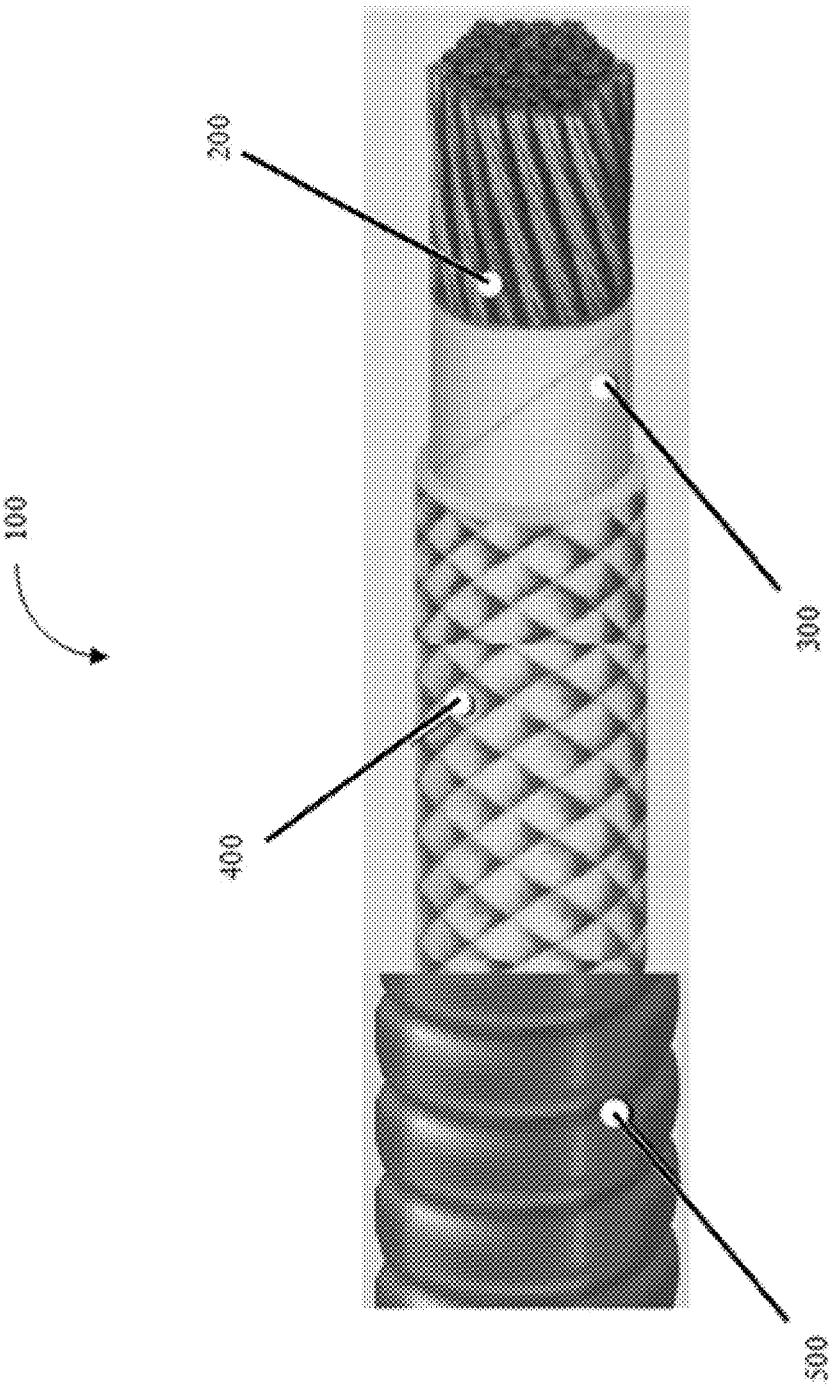
FIG. 1 depicts a cross-sectional view of an example cable for use in nuclear facilities as a substitute for mineral-insulated cables, according to one or more aspects described herein.

This drawings is provided for purposes of illustration only and merely depicts typical or example embodiments. This drawing is provided to facilitate the reader's understanding and shall not be considered limiting of the breadth, scope, or applicability of the disclosure. For clarity and ease of illustration, this drawing is not necessarily drawn to scale.

DETAILED DESCRIPTION OF THE INVENTION

In the following description of various examples of the invention, reference is made to the accompanying drawings, which form a part hereof, and in which are shown by way of illustration various example structures, systems, and steps in which aspects of the invention may be practiced. These aspects are indicative, however, of but a few of the various ways in which the principles of the invention may be employed and the present invention is intended to include all such aspects and their equivalents. It is to be understood that other specific arrangements of parts, structures, example devices, systems, and steps may be utilized, and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three-dimensional orientation of structures in order to fall within the scope of this invention.

The invention described herein relates to an electrical cable for use in nuclear facilities as a substitute for mineral-insulated cables. In various embodiments, the cable described herein may be configured (and suitable) for use in applications that include exposure to neutron, gamma, beta, and/or alpha irradiation in excess of 200 Megarads and in excess of 1,000 Megarads total integrated dosage (TID). In various embodiments, the cable may be configured (and suitable) for use in temperatures up to 450° C. and/or continuous submergence in water or chemical solution. In various embodiments, the cable may at least one conductor, insulation, a jacket, and armor, as described herein. The conductor may consist of copper, copper coated with nickel, or nickel. The insulation may comprise phlogopite or muscovite mica tape that may be helically or longitudinally applied in overlapping concentric layers. The mica tape may be bonded to glass braids or woven glass cloth to improve tensile strength and physical durability. The jacket may comprise a woven glass braid applied over the insulation of an individual single conductor and/or multiple conductors. The armor may comprise a hermitically sealed metallic armor applied over the cable. In various embodiments, the inorganic materials utilized may be configured to limit the creation of adverse and/or undesirable elements instigated by transmutation from neutron irradiation exposure. For example, the mica tape may include an elastomeric layer that bonds adjacent and overlapping mica tape layers that thru an oxidative pyrolysis process converts to an inorganic material yielding a completely inorganic insulation.

FIG. 1 depicts a cross-sectional view of an electrical cable 100 for use in nuclear facilities as a substitute for mineral-insulated cables, according to one or more aspects described herein. As shown in FIG. 1, cable 100 may include at least one conductor 200, insulation 300, a jacket 400, and armor 500. As can be appreciate, variations are possible. In various embodiments, insulation 300 may be wrapped around the at least one conductor 200. In various embodiments, jacket 400 may be wrapped around insulation 300. In various embodiments, armor 500 may be applied over each of the at least one conductor 200, insulation 300, and jacket 400. In some embodiments, cable 100 may also include filler 600, binder 700, and/or one or more other components.

Conductor(s) 200

In various embodiments, cable 100 may include one or more conductors 200. The one or more conductors 200 may include any material capable of facilitating movement of electric charges or any other communication medium. In various embodiments, conductor 200 may include an electric conductor in the form of a plurality of electrically conductive wires. In some embodiments, the plurality of electrically conductive wires making up conductor 200 may be twisted or in the form of a bundle. In various embodiments, conductor 200 may comprise conductive materials such as copper, copper coated with nickel (e.g., 2% or 27%), nickel, and/or any other suitable conductive material. The one or more conductors 200 may be capable of facilitating movement of energy capable of powering a device or facilitating communication or control signal between devices. In various embodiments, the at least one conductor 200 may be configured to yield a continuous operating temperature that ranges between 90° C. and 450° C. as recognized by industry standards for cable design.

In some embodiments, the at least one conductor 200 may include two or more conductor materials or conductors formed from varying conducting materials. In various embodiments, the at least one conductor 200 may include any number of conductors or any appropriate configuration using any combination of the conductors. In some embodiments, insulation 300 may be wrapped around any number of the conductors 200 as a whole, wrapped around individual conductors 200 within the cable, or to a bundle or grouping of a portion of the conductors 200. In various embodiments, insulation 300 may be wrapped around multiple conductors 200 twisted together to form multiconductor embodiments. FIG. 1 is merely an exemplary embodiment and is depicted solely for the sake of brevity. However, one skilled in the art will understand that other appropriate configurations may be utilized without departing from the present teachings.

As depicted in FIGS. 2-5 and described herein, cable 100 may comprise one or more conductors 200. For example, in some embodiments, cable 100 may include two, three, ten, or any other suitable number of conductors 200. In various embodiments, two or more conductors 200 may be provided together with filler 600, as necessary. Filler 600 may provide compressive force between one or more conductors 200 and other components of cable 100, such as armor 500. In various embodiments, filler 600 may comprise high temperature filler. Filler 600 may be located between conductors 200 inside insulation 300 or between conductors 200 outside jacket 400. In various embodiments, the conductors 200 may comprise 27% nickel coated copper. In some embodiments, conductor 200 may comprise a stranded conductor of one of various grades, such as 12 AWG (19/0.0179"), 18 AWG (19/0.0092"), 22 AWG (19/0.00634"), or any other suitable grade.

Insulation 300

In various embodiments, cable 100 may include insulation 300. Insulation 300 may be wrapped around one or more conductors 200. For example, insulation 300 may be configured to fully surround at least one conductor 200. When insulation 300 is positioned surrounding at least one conductor 200, cable 100 may provide benefits within high-temperature environments, i.e., with temperatures up to 450° C. and/or continuous submergence in water or chemical solution. In various embodiments, insulation 300 may comprise inorganic tape. For example, insulation 300 may consist of phlogopite or muscovite mica tape. In an example embodiment, insulation 300 may comprise inorganic tape that may be helically or longitudinally applied in overlapping concentric layers around one or more conductors 200. Accordingly, in the foregoing example embodiment, insulation 300 may comprise reinforced mica tape. In various embodiments, insulation 300 may comprise high grade reinforced mica tape. In example embodiments (such as those depicted in FIGS. 2-5), insulation 300 may have a nominal diameter between 0.08 and 0.16 inches. In various embodiments, insulation 300 may comprise inorganic tape that is bonded to glass braids or woven glass cloth to improve tensile strength and physical durability. In an example embodiment, insulation 300 may comprise mica tape that includes elastomeric layer that bonds adjacent and overlapping mica tape layers that thru an oxidative pyrolysis process converts to an inorganic material yielding a completely inorganic insulation. In various embodiments, inorganic materials used in insulation 300 may allow reduced smoke generation and reduced flame spread speed.

In some embodiments, cable 100 may include a second layer of insulation. For example, in some embodiments, cable 100 may include a binder 700 surrounding a set of conductors 200, each with their own insulation 300 and jacket 400. For example, as depicted in FIGS. 2-5 described further herein, cable 100 may include a binder 700 wrapped around a set of conductors, each with their own insulation 300 and jacket 400, together with a high temperature filler 600. In various embodiments, binder 700 may comprise mica tape. In some embodiments, binder 700 may be similar to and function essentially the same as insulation 300. In some embodiments, the mica binder tape of binder 700 may be affixed with a 50% nominal overlap. In example embodiments (such as those depicted in FIGS. 2-5), binder 700 may have a nominal diameter between 0.2 and 0.7 inches.

Jacket 400

In various embodiments, cable 100 may include a jacket 400. Jacket 400 may be wrapped around insulation 300. For example, jacket 400 may be wrapped around insulation 300 wrapped around a single conductor 200 or insulation 300 wrapped around multiple conductors 200 (i.e., in a multiple conductor design). In various embodiments, jacket 400 may comprise a woven glass braid. The woven glass braid of jacket 400 may be configured to function as a sacrificial layer protecting insulation 300 during manufacturing, handling, terminating, and/or installation. In some embodiments, the woven glass braid of jacket 400 may be positioned about insulation 300 with a rotary machine or other device, which allows jacket 400 to be securely positioned on insulation 300. In some embodiments, jacket 400 may comprise a glass braid with a high temperature finish. In example embodiments (such as those depicted in FIGS. 2-5), jacket 400 may have a nominal diameter between 0.09 and 0.18 inches.

Armor Shell 500

In various embodiments, cable 100 may include armor 500. Armor 500 may include an armor shell comprising a sheath, exterior coating, and/or other protective layer located proximate to an exterior surface of jacket 400 to protect the inner components of cable 100. Armor 500 may be substantially concentric to the at least one conductor 200 and constructed from a strong material, such as stainless steel or some other metal. In various embodiments, armor 500 may comprise an overall hermitically sealed metallic armor applied over at least jacket 400, insulation 300, and a conductor 200. Armor 500 may thus comprise an outer sheath of cable 100 that runs along a length of cable 100. In various embodiments, armor 500 may consist of stainless steel, copper, aluminum, and/or one or more other metals. In various embodiments, armor 500 may comprise corrugated copper armor. For example, armor 500 may comprise 0.025" impervious corrugated copper armor. In other embodiments, armor 500 may comprise smooth copper armor. For example, armor 500 may comprise 0.016" impervious smooth copper armor. In some embodiments, smooth copper armor 500 may comprise copper tube armor.

In various embodiments, armor 500 may be configured to provide protection as a moisture barrier such that armor 500 may prevent moisture of a facility (i.e., various form of liquid and/or vapor) from adversely degrading cable 100. In particular, armor 500 may be configured to prevent moisture from a facility (e.g., a nuclear facility) from adversely degrading the insulating properties of insulation 300. In various embodiments, armor 500 may be configured to protect cable 100 from being punctured or penetrating by foreign objects, such as debris from a drilling process. In some embodiments, armor 500 may include any woven, solid, particulate-based and layered protecting material(s). In some embodiments, insulation 300 may be the only material between the at least one conductor 200 and armor 500. However, other materials and layers of materials may optionally be used with cable 100, such as jacket 400. In various embodiments, armor 500 may be configured to form a substantially cylindrical body around cable 100. The substantially cylindrical body may be coaxially received within the nuclear facility's openings and configured to bear against any appropriate type of protective sealing. In other embodiments, armor 500 may be a non-circular, oval, polygonal, triangular, or a combination of any appropriate shape to facilitate one or more applications.

Figure 2:
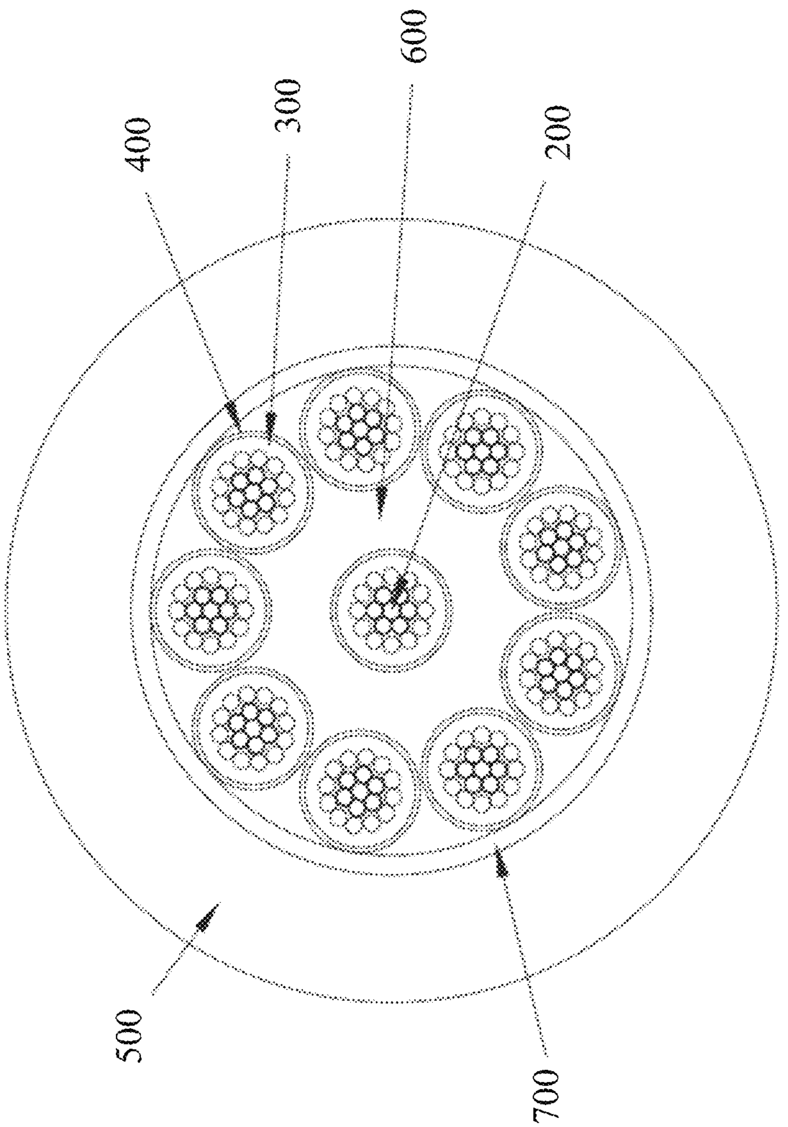
FIGS. 2-5 depict cross-sectional end views of example embodiments of a cable for use in nuclear facilities as a substitute for mineral-insulated cables, according to one or more aspects described herein.
Figure 3:
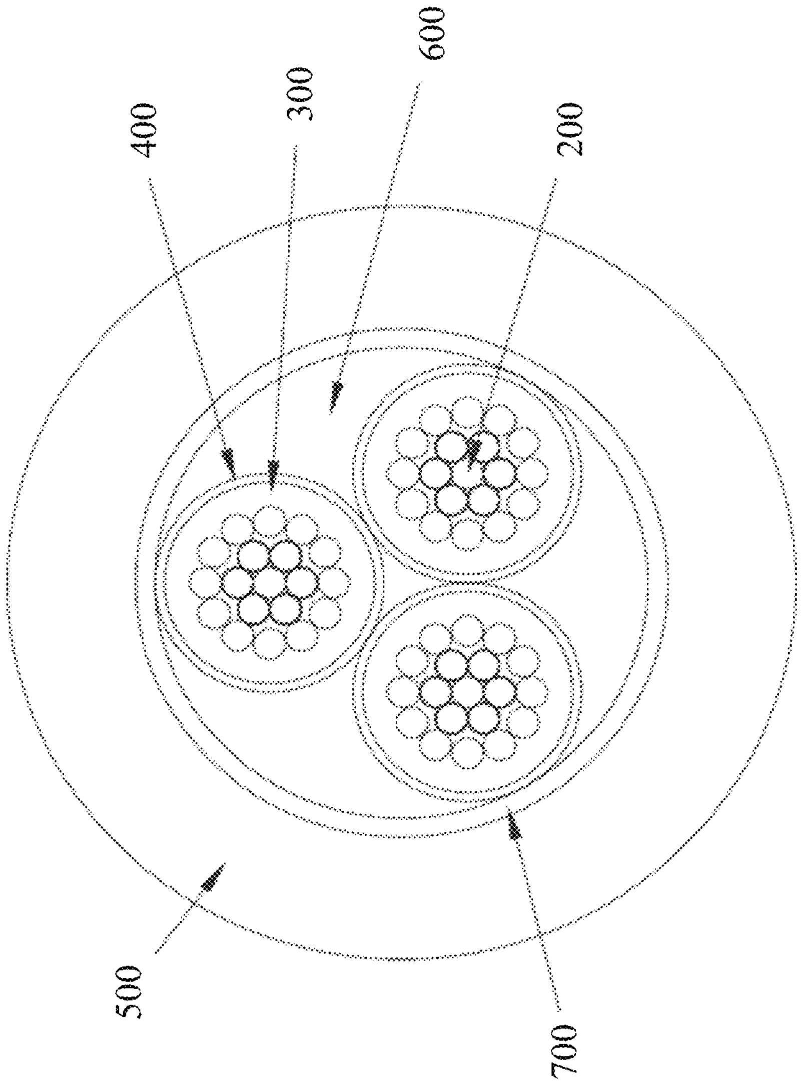
Figure 4:
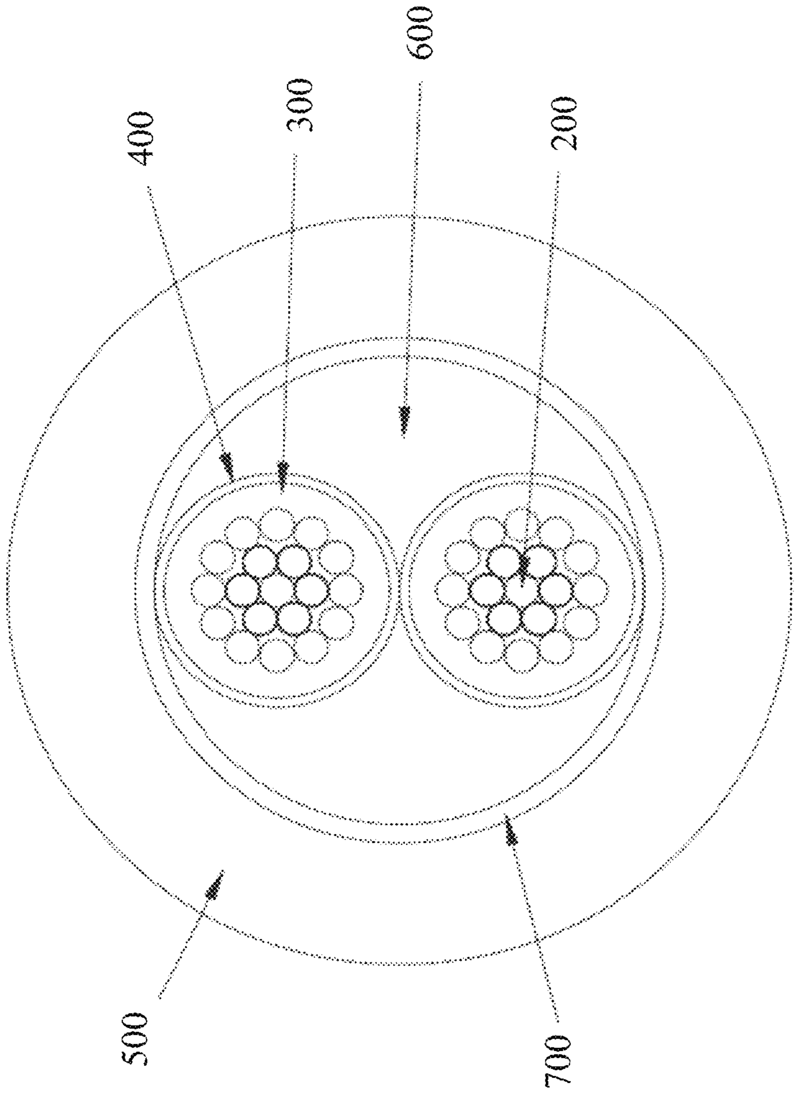
Figure 5:
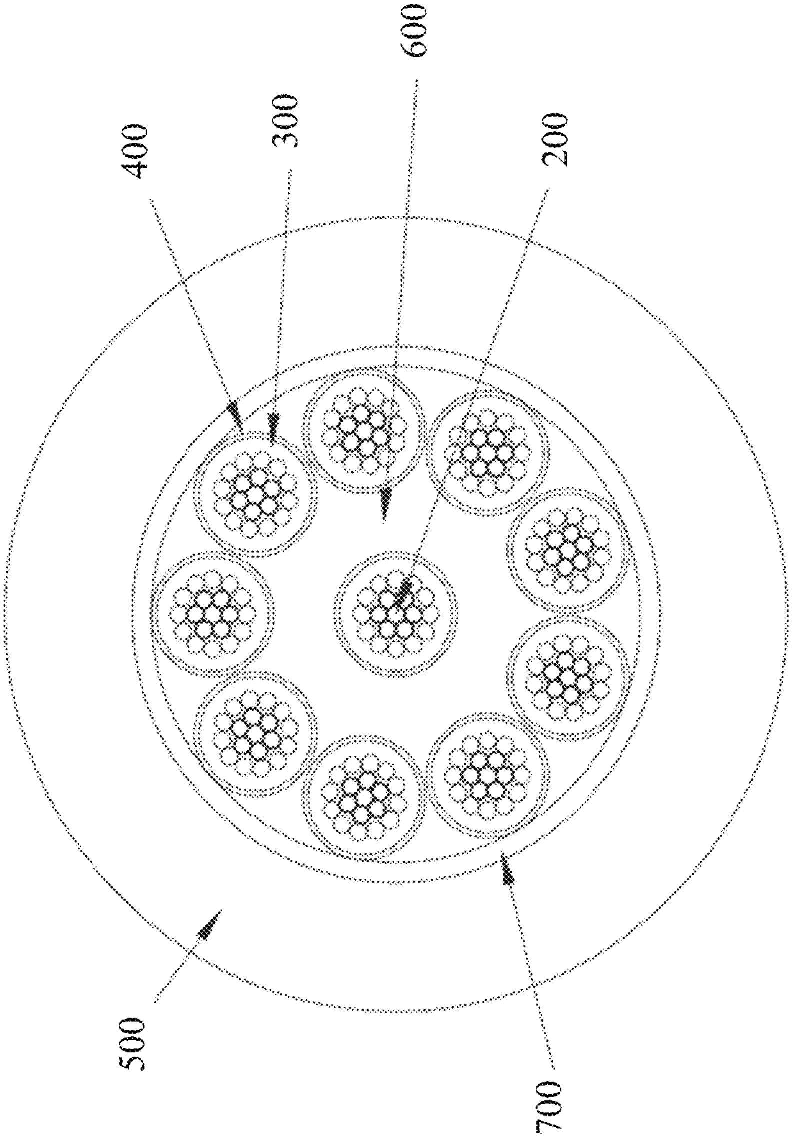

FIGS. 2-5 depict cross-sectional end views of example embodiments of a cable for use in nuclear facilities as a substitute for mineral-insulated cables, according to one or more aspects described herein. For example, FIG. 2 depicts an example embodiment of cable 100 having ten (10) stranded 18 AWG conductors 200 and corrugated copper armor 500, FIG. 3 depicts an example embodiment of cable 100 having three (3) stranded 12 AWG conductors 200 and corrugated copper armor 500, FIG. 4 depicts an example embodiment of cable 100 for use in a nuclear facility or for nuclear applications having two (2) stranded 22 AWG conductors 200 and smooth copper tube armor 500, and FIG. 5 depicts an example embodiment of cable 100 for use in a nuclear facility or for nuclear applications having ten (10) stranded 12 AWG conductors 200 and corrugated copper armor 500. In various embodiments, cable 100 may include at least one conductor 200, insulation 300, a jacket 400, armor 500, filler 600, and a binder 700, as shown in the example embodiments depicted in FIGS. 2-5.

Figure 6B:
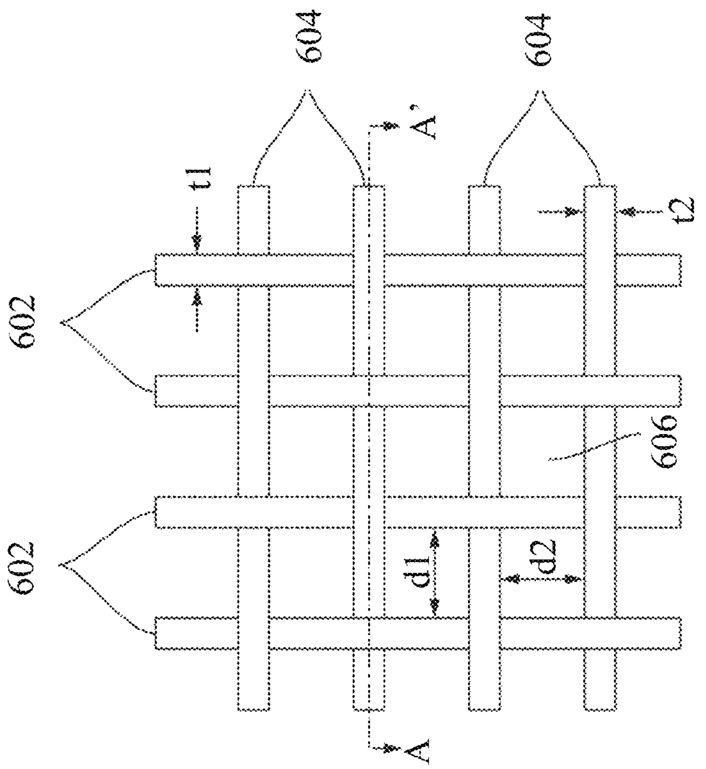
FIGS. 6A and 6B depict a three-dimensional perspective view and a two-dimensional plan view, respectively, of an example woven mesh of glass braids forming a jacket for a cable, according to one or more aspects described herein.
Figure 6A:
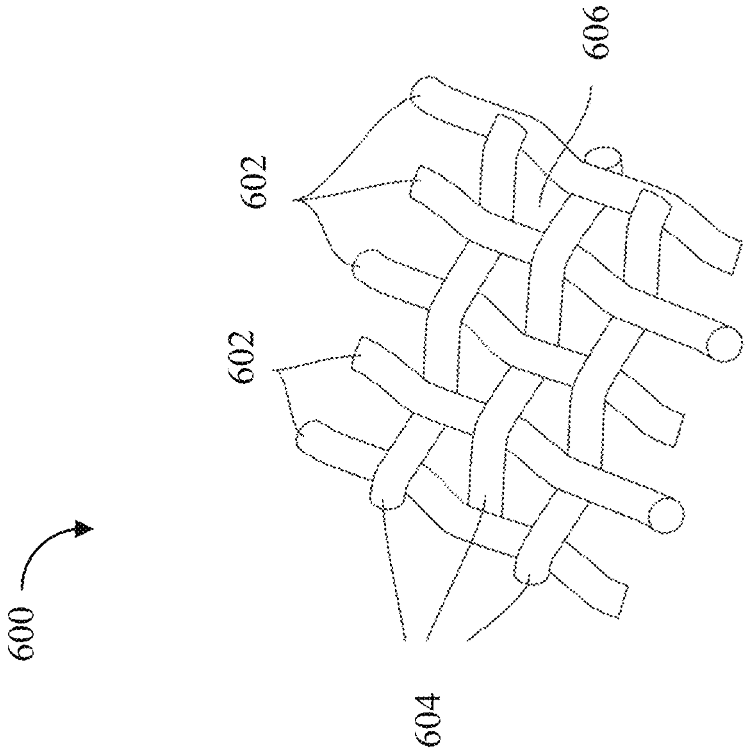
Figure 6C:
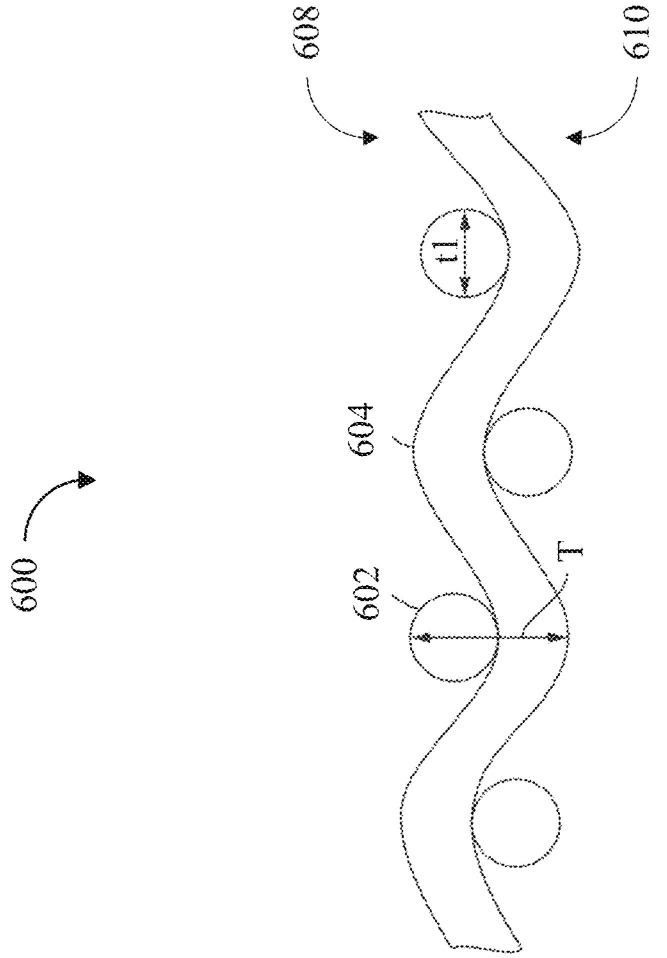
FIG. 6C depicts a cross-section along line A-A' of the jacket depicted in FIG. 6B, according to one or more aspects described herein.

FIGS. 6A and 6B depict a three-dimensional perspective view and a two-dimensional plan view, respectively, of a woven mesh 600 of glass braids forming jacket 400, and FIG. 6C depicts a cross-section along line A-A' of jacket 400 depicted in FIG. 6B, according to one or more aspects described herein. In various embodiments, jacket 400 may include a woven mesh 600 made of a first plurality of braids 602 running in a first direction and a second plurality of braids 604 running in a second direction. The woven braids of the jacket 400 may form one or more openings 606, which can be defined by one or more widths or diameters (e.g., d1, d2). In various embodiments, the size and shape of the openings can vary based on the type of weave (e.g., number, shape and size of openings; angle between intersecting openings, etc.) to provide benefits within high-temperature environments, i.e., with temperatures up to 450° C. For example, openings of woven mesh 600 may be a rectangular, triangular, polygonal, or any other combination of appropriate shapes without departing from the scope of the invention described herein. In various embodiments, a woven mesh may be characterized as a two-dimensional sheet or layer. However, a close inspection of a woven mesh may reveal a three-dimensional structure due to the rising and falling of intersecting braids of the mesh. Accordingly, as shown in FIG. 6C, a thickness T of the woven mesh 600 may be thicker than the thickness of a single braid (e.g., t1). As used herein, the thickness T is the maximum thickness between a first side 608 and a second side 610 of the woven mesh.

In various embodiments, as shown in FIG. 6B, the one or more openings 606 have a diameter d1, defined as a distance between first plurality of braids 602, and a diameter d2, defined as a distance between second plurality of braids 604. In some embodiments, d1 and d2 may be equal or unequal, depending on the weave geometry. In various embodiments, the one or more openings 606 may be equally spaced apart around a woven mesh 600. For example, an angle between neighboring access openings may be roughly 90 degrees, as depicted in FIG. 6B. In some embodiments, a height of each opening may be roughly the same for each of the one or more openings 606. In other embodiments, a height of one or more individual openings 606 may be different from the height of one or more other openings 606.

In various embodiments, a first plurality of braids 602 may include a thickness t1, and a second plurality of braids 604 has a thickness t2. As shown in FIG. 6A, the thicknesses t1 and t2 may be the maximum diameters or thicknesses of the braid cross-section. According to some embodiments, first plurality of braids 602 all may include the same thickness t1, and the second plurality of braids 604 all have the same thickness t2. In addition, t1 and t2 may be equal. However, in alternative embodiments, t1 and t2 may not be equal such as when first plurality of braids 602 are different from the second plurality of braids 604. Also, each of the first plurality of braids 602 and second plurality of braids 604 may contain braids of two or more different thicknesses.

Figure 7:
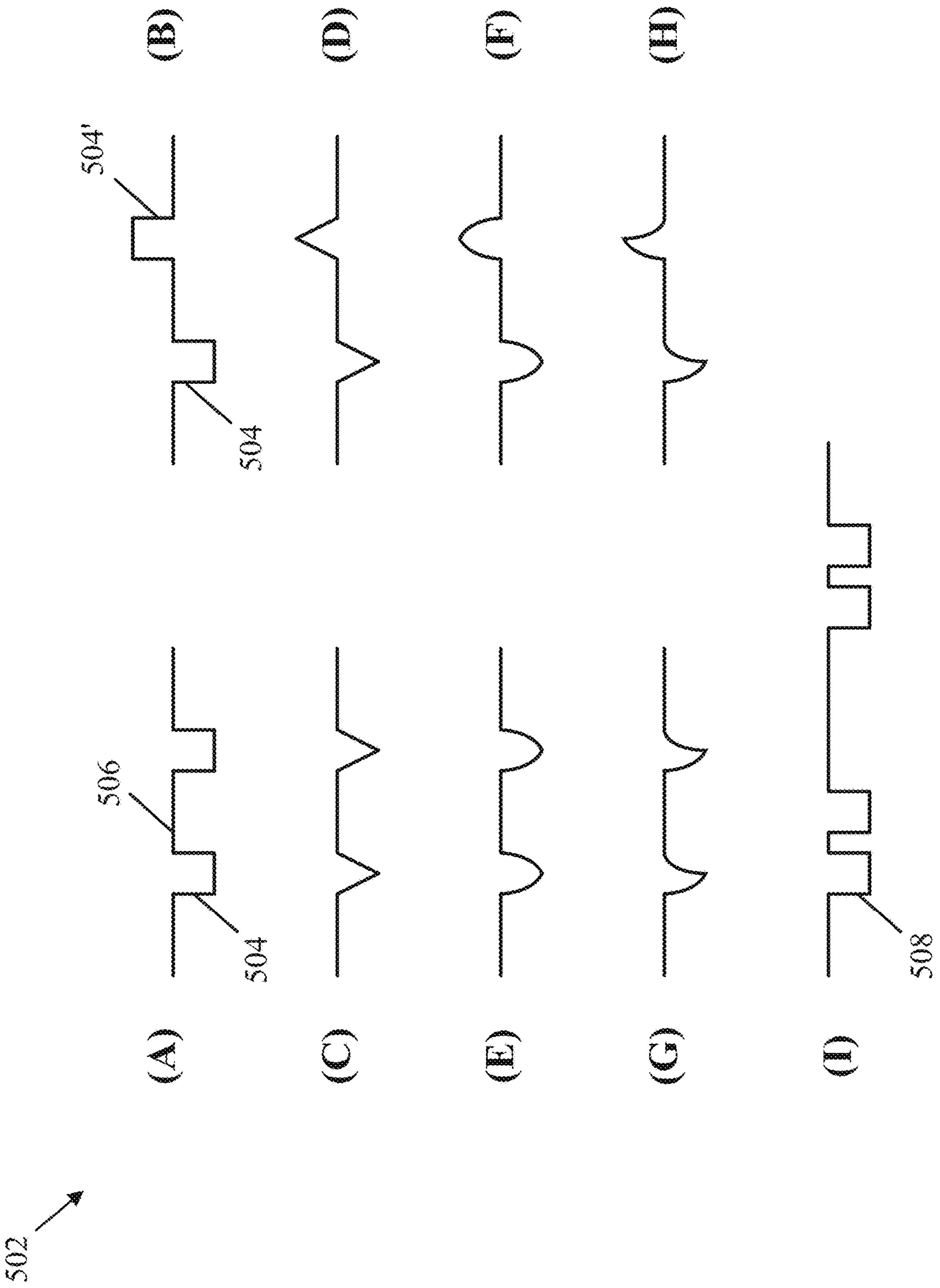
FIG. 7 depicts cross-sectional views of example corrugation patterns for armor of a cable designed for use in nuclear facilities as a substitute for mineral-insulated cables, according to one or more aspects described herein.

FIG. 7 depicts cross-sectional views of example corrugation patterns 502 for armor 500 of a cable 100 designed for use in nuclear facilities as a substitute for mineral-insulated cables, according to one or more aspects described herein. In various embodiments, armor 500 described herein may include tensile stiffness and provide structural protection from invasion of foreign objects. In some embodiments, armor 500 may comprise a substantially planar sheet member having a length and a width and a corrugation pattern 502 disposed therein. In various embodiments, corrugation pattern 502 may comprise at least one groove 504 extending across the width of the sheet member and having a defined groove width, where the defined land width differs from the defined groove width. In various embodiments, the corrugation pattern 502 may also comprise a at least one flat portion 506 extending across the width of the sheet member and having a defined land width.

As depicted in FIG. 6, various embodiments (A) through (I) provide examples of corrugation patterns 502 that can be disposed in an exterior surface of armor 500. For example, as shown in (A), corrugation pattern 502 may include groove 504 alternate with flat portion 506. In various embodiments, as shown in (B), corrugation pattern 502 may comprise an alternating groove 504'. In each of these configurations, flat portion 506, being substantially flat, provides tensile stiffness while the groove 504 provides flexibility to the interior armor 500. In various embodiments, groove 504 of corrugation pattern 502 may be rectangular, as shown in (A) and (B), triangular, as shown in (C) and (D), curved, as shown in (E) and (F), directionally curved, as shown in (G) and (H), or any other combination of appropriate shapes without departing from the scope of the invention described herein. In various embodiments, as depicted in (I), armor 500 may comprise a repeating pattern of a pair of grooves 508 each having a first and second width.

Manufacturing Process

As discussed herein, in various embodiments, armor 500 may comprise an overall hermitically sealed metallic armor. Yielding a hermetically sealed armor may be achieved by a continuous process where strips of metal are folded and formed into a tube and the longitudinal seam that is formed is welded. This may also be achieved through a drawing process where billets of metal are drawn thru dies to form a tube.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

Reference in this specification to “one implementation”, “an implementation”, “some implementations”, “various implementations”, “certain implementations”, “other implementations”, “one series of implementations”, or the like means that a particular feature, design, structure, or characteristic described in connection with the implementation is included in at least one implementation of the disclosure. The appearances of, for example, the phrase “in one implementation” or “in an implementation” in various places in the specification are not necessarily all referring to the same implementation, nor are separate or alternative implementations mutually exclusive of other implementations. More-over, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. An electrical cable for use in nuclear facilities and resistant to irradiation in excess of 200 Megarads, the electrical cable comprising:

at least one conductor;

insulation wrapped around the at least one conductor, the insulation comprising mica tape applied in overlapping layers around the at least one conductor, wherein the mica tape includes an elastomeric layer that bonds the overlapping layers and converts to an inorganic material after undergoing an oxidative pyrolysis process yielding a completely inorganic insulation;

a jacket applied over an exterior of the insulation; and an armor shell applied around the at least one conductor, the insulation, and the jacket, the armor shell comprising a hermetically sealed metallic armor that forms an exterior of the cable.

2. The cable of claim 1, wherein the at least one conductor comprises at least one of copper, copper coated with nickel, and nickel.

3. The cable of claim 2, wherein the at least one conductor comprises 27% nickel coated copper.

4. The cable of claim 1, wherein the at least one conductor comprises a stranded conductor.

5. The cable of claim 1, wherein the mica tape comprises phlogopite or muscovite mica tape.

6. The cable of claim 1, wherein the insulation is helically applied in overlapping layers around the at least one conductor.

7. The cable of claim 1, wherein the insulation is longitudinally applied in overlapping layers around the at least one conductor.

8. The cable of claim 1, wherein the jacket comprises a woven glass braid.

9. The cable of claim 1, wherein the armor shell comprises a sheath that runs a length of the cable.

10. The cable of claim 1, wherein the armor shell comprises corrugated copper.

11. The cable of claim 1, wherein the armor shell comprises a smooth copper tube.

12. The cable of claim 1, wherein the cable comprises a set of conductors including the at least one conductor, wherein each conductor of the set of conductors comprises a stranded conductor, wherein each conductor is (i) wrapped with a respective insulation of a set of insulations, including the insulation wrapped around the at least one conductor, and (ii) wrapped with a respective jacket of a set of jackets, including the jacket applied over the exterior of the insulation, wherein one jacket of the set of jackets is applied over an exterior of each of the set of insulations, wherein the cable further comprises a binder surrounding the set of conductors, the set of insulations, and the set of jackets, and wherein the armor shell is applied over an exterior of the binder.

13. The cable of claim 12, wherein each conductor of the set of conductors comprises ten 18 AWG stranded conductors, and wherein the armor shell comprises corrugated copper.

14. The cable of claim 12, wherein each conductor of the set of conductors comprises three 12 AWG stranded conductors, and wherein the armor shell comprises corrugated copper.

15. The cable of claim 12, wherein each conductor of the set of conductors comprises two 22 AWG stranded conductors, and wherein the armor shell comprises a smooth copper tube.

16. The cable of claim 12, wherein each conductor of the set of conductors comprises ten 12 AWG stranded conductors, and wherein the armor shell comprises corrugated copper.

17. The cable of claim 1, wherein the cable is resistant to total integrated dosage in excess of 1,000 Megarads.

18. An electrical cable for use in nuclear facilities and resistant to irradiation in excess of 200 Megarads, the electrical cable comprising:

at least one conductor;

insulation wrapped around the at least one conductor, the insulation comprising mica tape applied in overlapping layers around the at least one conductor, wherein the mica tape includes an elastomeric layer that bonds the overlapping layers and converts to an inorganic material after undergoing an oxidative pyrolysis process yielding a completely inorganic insulation;

a jacket comprising a woven glass braid, wherein the jacket is applied over an exterior of the insulation; and an armor shell applied around the at least one conductor, the insulation, and the jacket, wherein the armor shell forms an exterior of the cable.

19. An electrical cable suitable to limit transmutation from neutron irradiation exposure, the electrical cable comprising:

at least one conductor;

insulation wrapped around the at least one conductor, the insulation comprising mica tape applied in overlapping layers around the at least one conductor, wherein the mica tape includes an elastomeric layer that bonds the overlapping layers and converts to an inorganic material after undergoing an oxidative pyrolysis process yielding a completely inorganic insulation;

a jacket applied over an exterior of the insulation; and an armor shell applied around the at least one conductor, the insulation, and the jacket, wherein the armor shell forms an exterior of the cable.

20. The cable of claim 19, wherein the inorganic insulation comprises a diameter between 0.08 and 0.16 inches.

* * * * *